(12) United States Patent
Sase (10) Patent No.: US 11,337,553 B2
(45) Date of Patent: May 24, 2022

(54) ELECTRIC HEATING GRIDDLE DEVICE FOR BAKING SPHERICAL FOODS

(71) Applicant: Hot Land Co., Ltd., Tokyo (JP)

(72) Inventor: Morio Sase, Tokyo (JP)

(73) Assignee: HOT LAND CO., LTD, Tokyo (JP)

( * ) Notice: Subject to any disclaimer, the term of this patent is extended or adjusted under 35 U.S.C. 154(b) by 313 days.

(21) Appl. No.: 16/607,005

(22) PCT Filed: Apr. 6, 2018

(86) PCT No.: PCT/JP2018/014661
§ 371 (c)(1),
(2) Date: Oct. 21, 2019

(87) PCT Pub. No.: WO2018/203458
PCT Pub. Date: Nov. 8, 2018

(65) Prior Publication Data
US 2020/0352393 A1    Nov. 12, 2020

(30) Foreign Application Priority Data

May 1, 2017    (JP) .............................. JP2017-091190

(51) Int. Cl.
*H05B 3/68*    (2006.01)
*A47J 37/06*    (2006.01)
*H05B 1/02*    (2006.01)

(52) U.S. Cl.
CPC ........ *A47J 37/0676* (2013.01); *H05B 1/0261* (2013.01)

(58) Field of Classification Search
CPC .......... H05B 3/68; H05B 3/72; H05B 1/0258; H05B 1/0261; H05B 1/0266; A47J 37/049; A47J 37/0611; A47J 37/067; A47J 37/0676; A47J 37/0682; A47J 37/0694; A21B 5/00
USPC ..... 219/450.1, 451, 452.12, 1, 460.1, 461.1, 219/465.1, 468.1, 468.2
See application file for complete search history.

(56) References Cited

U.S. PATENT DOCUMENTS 6,138,554 A * 10/2000 McFadden .......... A47J 37/0682
219/462.1
2015/0305557 A1* 10/2015 Nelson ................. A47J 37/0611
99/375

FOREIGN PATENT DOCUMENTS

| JP | 10-113292 A | * | 5/1998 |
| JP | 2005253868 A | | 9/2005 |
| JP | 2009125094 A | | 6/2009 |
| JP | 2010063579 A | | 3/2010 |

(Continued)

*Primary Examiner* — Hung D Nguyen
(74) *Attorney, Agent, or Firm* — DeLio Peterson & Curcio LLC; Peter W. Peterson (57) ABSTRACT

An electric heating griddle device for baking spherical foods able to shorten the time of baking spherical foods includes an iron plate part 2 made of cast iron having an upper surface 2a and a lower surface 2b that are planar, and which is formed to be a predetermined thickness between the upper surface and the lower surface, and an electric heating part 3 connected to the iron plate part 2 so as to contact a heat transfer surface 3a with the lower surface of the iron plate part 2. The iron plate part 2 has a plurality of recess parts 21 which are formed to be concave from the upper surface 2a to bake the spherical foods and the electric heating part 3 is formed so as that the heat transfer surface 3a is broad to substantially conform to the lower surface 2b of the iron plate part 2.

6 Claims, 10 Drawing Sheets

(56) References Cited

FOREIGN PATENT DOCUMENTS

JP        2014238378 A   * 12/2014
JP        2014238378 A     12/2014

* cited by examiner

ELECTRIC HEATING GRIDDLE DEVICE FOR BAKING SPHERICAL FOODS

CROSS-REFERENCE TO RELATED APPLICATION

The present application claims priority from Japanese application JP2017-91190 filed on May 1, 2017, the content of which is hereby incorporated by reference into this application.

BACKGROUND OF THE INVENTION

1. Field of the Invention

The present invention relates to an electrical heating griddle device for baking spherical foods, which has an iron plate part for baking the spherical foods.

2. Description of the Related Art

The electric heating griddle device for baking spherical foods of this kind is known, for example, as a configuration having a flat plate part and a plurality of recess plate parts each of which is curved with respect to the flat plate part, wherein whole of the flat plate part and the recess plate parts have an iron plate formed in a predetermined thickness (for example, about ⅕ of the depth of the recess plate part thickness) and electric heaters which are installed underneath of the iron plate spacing a predetermined distance, by heating the iron plate from below by the electric heaters, a plurality of Takoyaki as spherical foods inserted in each of the recess plate parts are baked (e.g. JP2005-253868).

In the electric heating griddle device for baking spherical foods configured as described above, the iron plate is heated by an electric heater, after the iron plate reaches the temperature suitable for baking spherical foods, the dough of the spherical foods are inserted into each of the recess plate parts. In this case, since the periphery of each of the recess plate parts are formed in very thin constant thickness compared with its depth, the recess plate parts can be heated to the temperature suitable for baking in a relatively short time.

However, in the case of the above electric heating griddle device for baking spherical foods, since the thickness of the recess plate part is thin, there is a disadvantage that the heat capacity of the recess plate part is small. Therefore, when the spherical food dough as e.g. Takoyaki dough (having dough that soft flour or the like is dissolved in water and toppings like octopus) is put into each recess plate part, the temperature of the iron plate falls rapidly. Particularly, in the case of Takoyaki, since it is preferable to increase the crispness of the outer peripheral by suppressing the growth of the soft flour gluten, the dough is kept in a low temperature, then the temperature of the recess plate parts significantly fall at the initial time of baking.

Therefore, there has been a problem that it takes lots of time to bake the spherical foods.

SUMMARY OF THE INVENTION

The present invention has been made in view of the above, and an object thereof is to provide an electric heating griddle device for baking spherical foods which is able to shorten the time of baking the spherical foods.

In order to solve the above problem, in accordance with an aspect of the present invention, an electric heating griddle device for baking spherical foods includes an iron plate part made of cast iron, which has an upper surface and a lower surface that are planar, and which is formed to be a predetermined thickness between the upper surface and the lower surface, and an electric heating part connected to the iron plate part so as to contact a heat transfer surface with the lower surface of the iron plate part, wherein the iron plate part has a plurality of recess parts which are formed to be concave from the upper surface to bake the spherical foods, and the electric heating part is formed so as that the heat transfer surface is broad to substantially conform to the lower surface of the iron plate part.

The iron plate part is preferably formed so as that the lower surface becomes planar by machining.

The upper surface of the iron plate part is preferably formed in a rectangular shape in a plan view, the plurality of the recess parts are disposed at predetermined intervals in a longitudinal direction of the upper surface, and at predetermined intervals in a width direction of the upper surface, the electric heating part, in a connecting state with the iron plate part, has a electric heater including a heat generating part extending in the longitudinal direction of the iron plate part and being arranged in a plurality of raw in the width direction of the iron plate part.

The electric heating part preferably has an upper plate part and a lower plate part which are made of material having a larger thermal conductivity compared with the cast iron, and which form a mutual stacked state, and has an electric heater, the upper plate part comprises the heat transfer surface in a top surface of the upper plate part, the electric heater is configured as that the heat generating part is fitted into grooves formed at least one of the mating surfaces of the upper plate part and the lower plate part.

At least a heat conductive grease is preferably filled into the gap between the groove and the heat generating part.

A heat conductive grease is preferably interposed between the lower surface of the iron plate part and the heat transfer surface of the electric heating part.

The iron plate part has preferably an end strip-shape frame part which extends in a strip shape along an edge of an end of a longitudinal direction of the upper surface and which is formed at one step higher from the upper surface, and a side strip-shape frame part which extends in a strip shape along an side edge of a width direction of the upper surface and which is formed at one step higher from the upper surface, each of the end strip-shape frame part and the side strip-shape frame part respectively has a ridge part which protrudes downward along each of outermost edges, the ridge part is formed gradually thinner in a downward direction.

The iron plate part and the electric heating part are preferably configured to be vibrated by a rotational vibration relating to a predetermined axis in a state in which the electric heating part is attached to the iron plate part, each of the recess parts has a bottom part formed by a curve of a spherical crown less than a hemisphere and an inner peripheral part formed so as to expand in diameter toward the upper surface of the iron plate part from the upper edge of the bottom part, the depth from the upper surface of the iron plate part to lowermost part of the bottom part is formed to be from $6/10$ to $9/10$ of a curvature diameter of the bottom part, a diameter in a plane parallel to the upper surface of the iron plate part and which is through a curvature center of the bottom part is formed to be larger than the curvature diameter of the bottom part.

Advantageous Effects of the Invention

According to the present invention, since the iron plate part which is formed to be a predetermined thickness between the upper surface and the lower surface is comprised, and the plurality of recess parts to be concave from the upper surface of the iron plate part to bake the spherical foods are formed, the cast iron exists around each of the recess parts without gaps. Therefore, the weight around the recess parts is increased, and the heat capacity around the recess parts becomes large. Meanwhile, the heat capacity can be represented by specific heat×weight, and it corresponds to the amount of heat to raise 1° C. of the temperature. Therefore, the part around the recess parts increases the heat capacity and its temperature becomes hard to be raised, otherwise the temperature hardly drops down once the temperature is raised.

Therefore, at the initial phase of baking the spherical foods, it is possible to suppress the fall of the temperature of the iron plate part around the recess parts, then it is possible to shorten the baking time of the spherical foods. In particular, even when the dough of Takoyaki, as a dough of the spherical foods, which contains much water and is required to be maintained at low temperature is input in the recess parts, it is possible to suppress the fall of the temperature around the recess parts and it is possible to shorten the baking time of the Takoyaki.

Moreover, since the electric heating part is connected to the lower surface of the iron plate part so as to contact the heat transfer surface, the heat generated at the electric heating part is directly transferred to the recess parts by using the heat conduction of the cast iron, and the decreased temperature of the recess part can be raised in a short time to the original temperature, it is possible to shorten the baking time of the spherical foods from this aspect.

Then, since it is possible to shorten the baking time, it is possible to suppress the growth of gluten, in the spherical foods, for example Takoyaki, the excellent crispness of the outer peripheral can be obtained.

The iron plate part has welded surfaces by the cast iron, since the lower surface is formed planar by machining, the contact area between the lower surface thereof and the heat transfer surface can be increased. That is, since it is possible to increase the amount of heat transferred from the electric heating part to the iron plate part, it is possible to heat the periphery of the recess parts efficiently. Therefore, the decreased temperature around the recess parts at the initial phase can be raised in a short time, then it is possible to shorten the baking time of the spherical foods from this aspect.

Since the plurality of the recess parts are disposed at predetermined intervals in a longitudinal direction of the upper surface, and at predetermined intervals in a width direction of the upper surface, and the electric heating part has the electric heater including the heat generating part extending in the longitudinal direction of the upper surface of the iron plate part and being arranged in a plurality of raw in the width direction of the upper surface of the iron plate part, the parts corresponding to the recess parts of the iron plate part can be more uniformly and efficiently heated. Therefore, it is possible to shorten the baking time of the spherical foods, and it is possible to stabilize the quality of the spherical foods to be baked in the recess parts.

Since the heat generating part is fitted into grooves formed at least one of the mating surfaces of the upper plate part and the lower plate part which are made of material having a larger thermal conductivity compared with the cast iron, all of the heat generated by the heat generating part is reliably transferred to the upper plate part and the lower plate part and the heat is transferred to the iron plate part by the heat conduction. Therefore, since the heat generated by the electric heater can be efficiently used, it is possible to heat the periphery of the recess parts in a short time.

Further, by dividing the upper plate part and the lower plate part which are in the mutual stacked state, the electric heater fitted in the groove is easily confirmed visually and can be replaced by detaching and attaching the electric heater against the groove. Therefore, it is possible to improve the maintainability.

Since at least the heat conductive grease is filled into the gap between the groove and the heat generating part, the heat of the electric heater can efficiently be transferred to the upper plate part and the lower plate part. Therefore, it is possible to heat the periphery of the recess parts in a short time more efficiently.

Since a heat conductive grease is interposed between the lower surface of the iron plate part and the heat transfer surface of the electric heating part, the heat conductivity from the electric heating part to the iron plate part can be increased. That is, it is possible to heat the periphery of the recess parts of the iron plate part 2 more efficiently in a short time.

Since the end strip-shape frame part which extends in a strip shape along an edge of an end of a longitudinal direction of the upper surface of the iron plate part and which is formed at one step higher from the upper surface is provided, and the side strip-shape frame part which extends in a strip shape along a side edge of a width direction of the upper surface of the iron plate part and which is formed at one step higher from the upper surface is provided, even when the dough of the spherical foods becomes the state being spilled from each of the recess parts to the upper surface, it is possible to prevent the dough of the spherical food from falling off at the end of a longitudinal direction or each side edge of a width direction.

Moreover, the scraps produced during baking the spherical foods can be removed smoothly along the upper surface from the other end opposite to the end of a longitudinal direction of the upper surface of the iron surface. In this case, since each of the side strip-shape frame part stands from the upper surface of the iron plate part, the scraps of the spherical foods can be removed cleanly outward from the upper surface by moving the spatula along the standing part as a guide.

Further, as it sometimes happens that the oil drawn to the recess parts and the upper surface during baking the spherical foods gradually moves beyond the end strip-shape frame part and the side strip-shape frame part and oozes outward of them, each of the end strip-shape frame part and the side strip-shape frame part respectively have ridge parts which protrude downward along each of outermost edges, which prevents the oil from moving around the outer peripheral surface of the side of the iron plate part or the electric heating part. Therefore, it is possible that the outer peripheral surface on the side of the iron plate part and the electric heating part are prevented from greasing.

Moreover, since each of the ridge parts is formed gradually thinner in a downward direction, the oil moved around the lower edge of each of the ridge parts 22c can be relatively easily separated from the edges and can be dropped just below each of the ridge parts. Therefore, since, for example, an oil receiver is provided just below each of the ridge parts, the dropped oil can be collected, which prevents from greasing the environment.

Since the iron plate part and the electric heating part are configured to be vibrated by a rotational vibration relating to a predetermined axis in a state in which the electric heating part is attached to the iron plate part, each of the recess parts has a bottom part formed by a curve of a spherical crown less than a hemisphere and an inner peripheral part formed so as to expand in diameter toward the upper surface of the iron plate part from the upper edge of the bottom part, the depth from the upper surface of the iron plate part to lowermost part of the bottom part is formed to be from 6/10 to 9/10 of a curvature diameter of the bottom part, a diameter in a plane parallel to the upper surface of the iron plate part and which is through a curvature center of the bottom part is formed to be larger than the curvature diameter of the bottom part, the dough of the spherical foods inserted into the recess parts starts to rotate around the curvature center of the bottom part in response to baking and hardening the outer peripheral portion thereof gradually.

That is, since the iron plate part receives the rotational vibration around the predetermined axis and then each of the recess parts receives the vibration displacement around the curvature center of the bottom part, the dough of the spherical foods inserted into the recess parts receives the force so as to rotate around the curvature center of the bottom part. Therefore, as the dough of the spherical foods is baked and the outer peripheral thereof is baked and hardened gradually, it rotates around the curvature center of the bottom part to be baked in the spherical shape having the diameter corresponding to the curvature diameter of the bottom part.

In this case, since the depth from the upper surface of the iron plate part to lowermost part of the bottom part is formed to be from 6/10 to 9/10 of a curvature diameter of the bottom part, about 1/10-4/10 of the baked Takoyaki protrudes from the upper surface of the iron plate part. Therefore, the spherical foods after baking can be easily taken out from the recess parts by such as piercing the protruded portion with a skewer.

Moreover, since the diameter in a plane parallel to the upper surface of the iron plate part and which is through a curvature center of the bottom part is formed to be larger than the curvature diameter of the bottom part, and the inner peripheral part, which is upper side of the bottom part, is formed so as to expand in diameter toward the upper surface of the iron plate part from the upper edge of the bottom part, the spherical foods can be easily taken out from the recess parts.

BRIEF DESCRIPTION OF THE DRAWINGS

FIG. 4b is a sectional view along the b-b line of FIG. 4a.

DETAILED DESCRIPTION OF THE INVENTION

The electric heating griddle device for baking spherical foods shown as an embodiment of the present invention is described in detail with reference to the drawings.

The electric heating griddle device for baking spherical foods 1 shown in this embodiment is configured to be integrally connected to both the iron plate part 2 and the electric heating part 3 by bolts A as shown in FIGS. 1a to 5d.

Figure 1A:
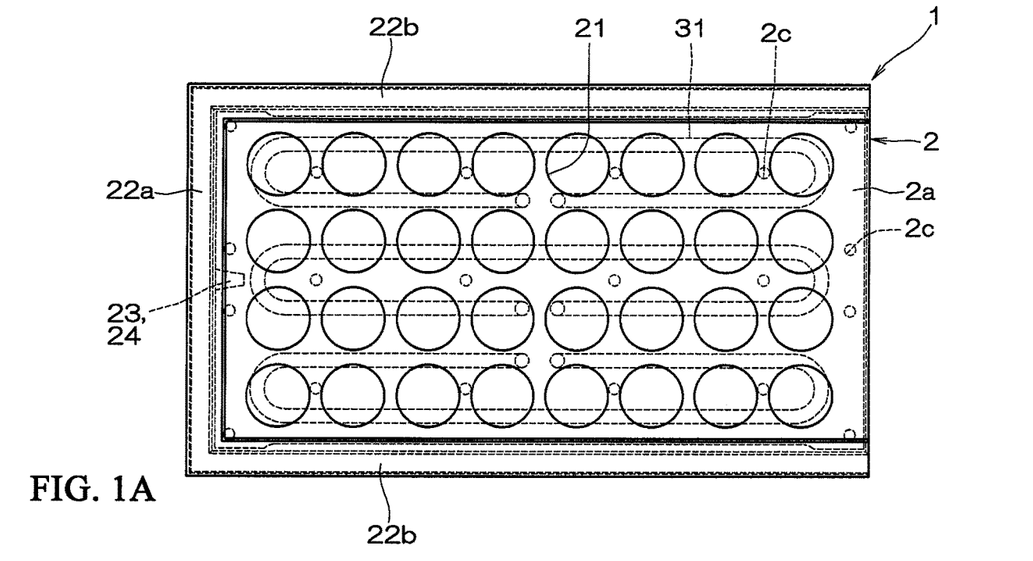
FIG. 1a is a plan view of the electric heating griddle device for baking spherical foods shown as an embodiment of the present invention.

The iron plate part 2, as shown in FIGS. 1a to 3g, is formed having a thickness from the upper surface 2a which is formed planar to the lower surface 2b similarly formed in planar is a predetermined size (for example, 40-60 mm) and is formed by being made of cast iron (gray iron as ordinary cast iron, e.g. JIS FD 200). The upper surface 2a, as shown in FIGS. 1a and 2a, is formed rectangular and planar in a plan view, and a plurality of recess parts 21 is formed at the predetermined positions thereof for baking Takoyaki W (see FIG. 1b) as the spherical foods. The upper surface 2a and the recess parts 21 are formed of casting surfaces, the surface roughness is around Ra10. However, the lower surface 2b is formed planar parallel to the upper surface 2a by machining.

The recess parts 21 are plurally (8 in this embodiment) disposed at predetermined intervals in the longitudinal direction of the upper surface 2a so as to form a single row, and the plurality of the rows (4 rows in this embodiment) are disposed at predetermined intervals in the width direction of the upper surface 2a.

Figure 4A:
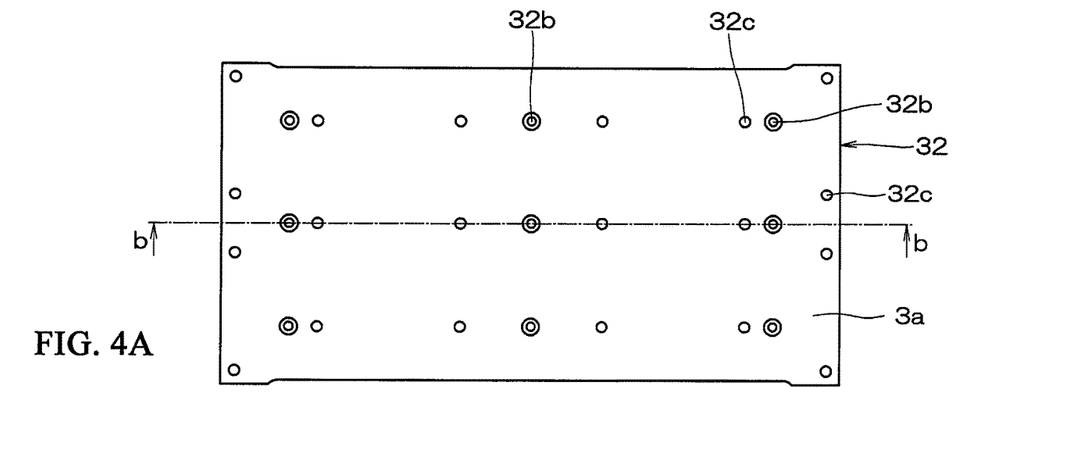
FIG. 4a is a plan view of the upper plate part of the electric heating part of the same electric heating griddle device for baking spherical foods.

On the other hand, the electric heating part 3 configured to be connected to the iron plate part 2 by bolts A so as to be in close contact with the heat transfer surface 3a, which is upside of the electric heating part 3, with the lower surface 2b of the iron plate part 2. The heat transfer surface 3a, as shown in FIG. 4a, is broad to substantially conform to the lower surface 2b (see FIG. 2b) of the iron plate part 2, and is formed planar to contact with the lower surface 2b closely.

Further, the electric heating part 3, as shown in FIGS. 1a-1c, 4a-4d and 5a-5d, has the electric heater 31 for heating the iron plate part 2. The electric heating part 3 has the upper plate part 32 and the lower plate part 33 which are coupled in a mutual stacked state, the top surface of the upper plate part 32 has the heat transfer surface 3a.

Since the upper plate part 32 and the lower plate part 33 are made of a cold-rolled plate of aluminum as the material having a larger thermal conductivity compared with the cast iron, and have excellent flatness and surface roughness, and excellent thermal conductivity. The lower surface of the upper plate part 32 and the upper surface of the lower plate part 33 are the mating surfaces 32a, 33a closely contacted each other in the mutual stacked state.

In this case, the plurality of the grooves 331 (three in this embodiment) for fitting the electric heater 31 are provided on the mating surface 33a of the lower plate part 33. The cross-section of each of the grooves 331 formed in a concave rectangular shape, and each of the grooves 331 has the long shape of an annular extending in the longitudinal direction (the same direction as the longitudinal direction of the upper surface 2a of the iron plate part 2 in the state that the electric heating part 3 is attached to the iron plate part 2).

Figure 4B:
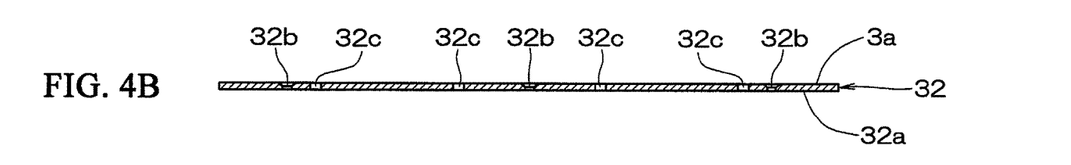
Figure 4C:
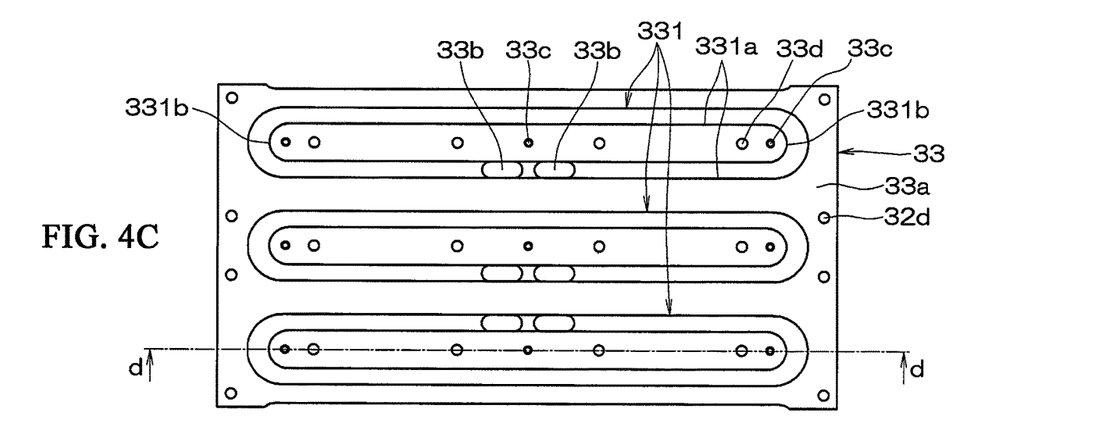
FIG. 4c is a plan view of the lower plate part of the electric heating part of the same electric heating griddle device for baking spherical foods.

That is, each of the grooves 331, as shown in FIG. 4c, is formed in an elongated annular by the straight groove parts 331a parallel to each other extending in the longitudinal direction of the lower plate part 33, and the curve grooves 331b which are semicircular and connects each end in the longitudinal direction of the straight groove parts 331a. Each of the grooves 331 formed in this way, are provided three at constant intervals in the width direction of the lower plate part 33. Therefore, it makes a state that six of the straight groove parts 331a extending in the longitudinal direction of the lower plate part 33 are arranged in parallel at predetermined intervals in the width direction of the lower plate part 33.

Further, a pair of through holes 33b for guiding each of the electric terminal parts 31c (see FIG. 5a) of the electric heater 31 fitted in each of the grooves 331 at the central part in the longitudinal direction of one of the straight groove parts 331a of the grooves 331 from the grooves 331 to the underneath of the lower plate part 33 is formed at the lower plate part 33. Each of the through-holes 33b is formed having the same width as the straight groove part 331a, and having an oval shape elongated in the extended direction of the straight groove part 331a.

The electric heater 31, as shown in FIGS. 5a-5d, is formed as a round rod, the heat generating part 31a is formed extending in an oval shape so as to fit into the grooves 331, the non-heat generating parts 31b, 31b at both ends are formed so as to protrude from the groove 331 to the underneath of lower plate part 33 through each of the through holes 33b, the electric terminal parts 31c, 31c are provided at the tip parts of the non-heat generating parts 31b, 31b. The non-heat generating parts 31b, 31b are bent so as to have right angles to the heat generating part 31a. The sheathed heater composed of a stainless steel pipe at the outer peripheral part of the heat generating part 31a and each of the non-heat generating parts 31b is used as the electric heater 31.

Further, the upper plate part 32 and lower plate part 33 are configure to be coupled to each other by countersunk screws (not shown). That is, at the upper plate part 32, as shown in FIGS. 4a and 4b, the plurality (9 in this embodiment) of the countersunk screw insertion holes 32b are formed at a predetermined interval for inserting the countersunk screws from the heat transfer surface 3a side. The countersunk screw insertion holes 32b are configured to prevent the heads of the countersunk screws from protruding from the heat transfer face 3a by receiving the heads in the countersinks processed at the heat transfer surface 3a side.

Figure 4D:
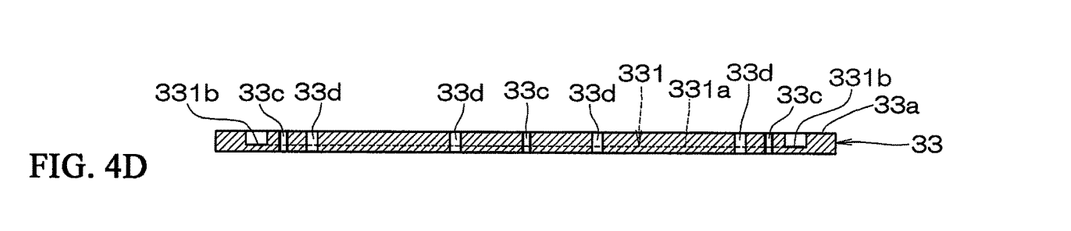
FIG. 4d is a sectional view along the d-d line of FIG. 4c.
Figure 5A:
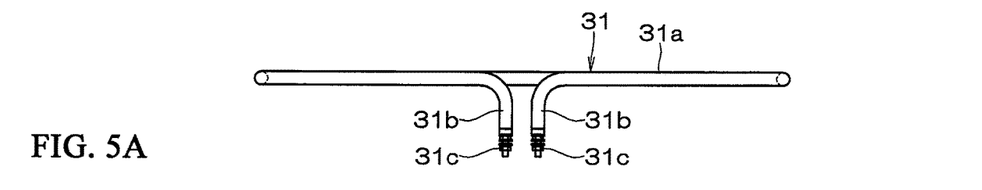
FIG. 5a is a front view of the sheathed heater of the electric heating part of the same electric heating griddle device for baking spherical foods.
Figure 5B:
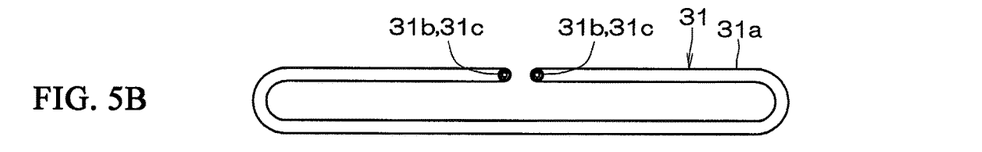
FIG. 5b is a bottom view of the sheathed heater of the electric heating part of the same electric heating griddle device for baking spherical foods.
Figure 5C:
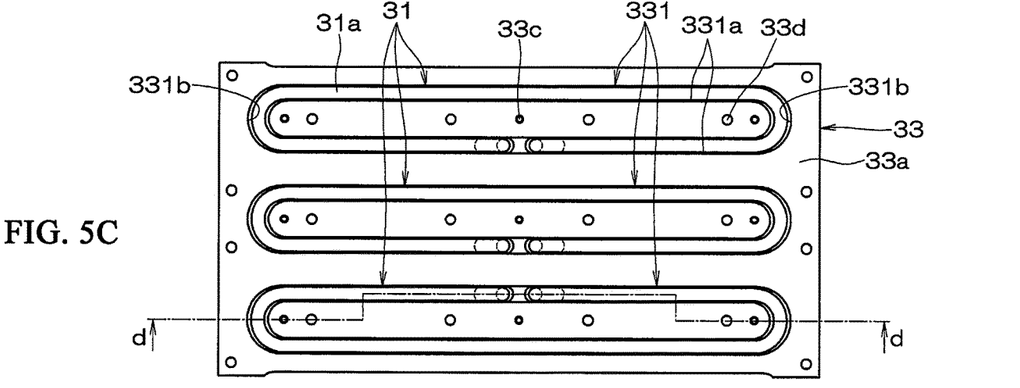
FIG. 5c is a plan view showing the state that the sheathed heater is embedded to each of the grooves of the lower plate part of the electric heating part of the same electric heating griddle device for baking spherical foods.
Figure 5D:
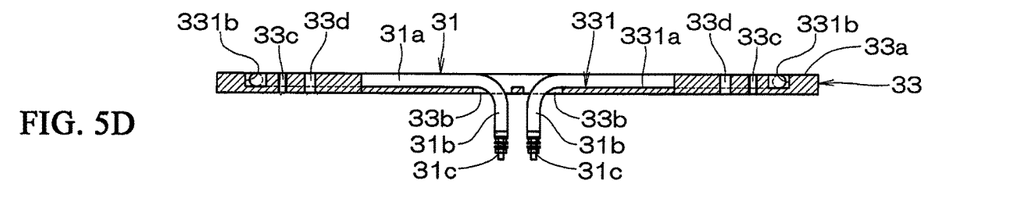
FIG. 5d is a sectional view along the d-d line of FIG. 5c.

On the other hand, in the lower plate part 33, as shown in FIGS. 4c and 4d, the screw holes 33c for screwing the countersunk screws at positions corresponding to each of the countersunk screw insertion holes 32b of the upper plate part 32 are formed. Meanwhile, it is needless to say that the countersunk screw insertion holes 32b and the screw holes 33c are formed at positions deviated from each of the grooves 331.

The upper plate part 32 and the lower plate part 33 composed in this way, configured to be coupled by the above each of the countersunk screws in the state that the heat conductive grease is filled into the gap between the grooves 331 and the heat generating part 31a of the electric heater 31 fitted to them, or the gap between the mating surface 32a of the upper plate part 32 and the heat generating part 31a.

The electric heating part 3 having the electric heater 31 as described above, as shown in FIGS. 1b and 1c, is configured to be secured to the iron plate part 2 by the bolts A.

In this case, in the upper plate part 32 and the lower plate part 33, as shown in FIGS. 4a-4d, the plurality (20 in each of the upper plate part 32 and the lower plate part 33 in this embodiment) of the insertion holes 32c, 33d for the bolts A are formed so as to penetrate the same positions at the upper plate part 32 and the lower plate part 33. It is also needless to say that these insertion holes 32c, 33d are formed at the positions deviated from each of the grooves 331, each of the countersunk screw insertion holes 32b and each of the screw holes 33c.

Figure 2A:
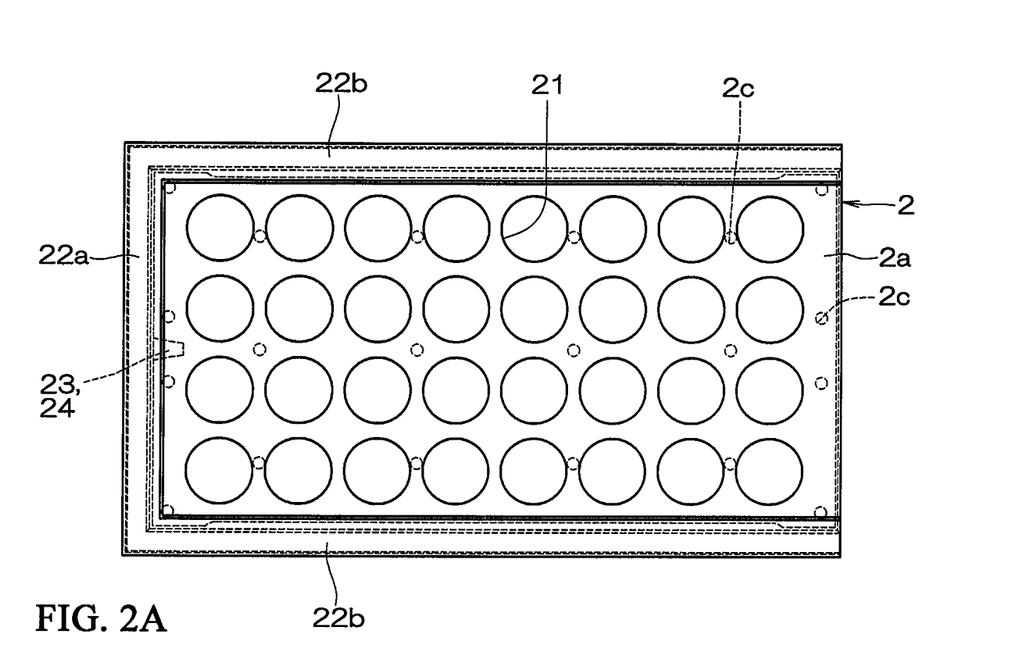
FIG. 2a is a plan view of the iron plate part of the same electric heating griddle device for baking spherical foods.
Figure 2B:
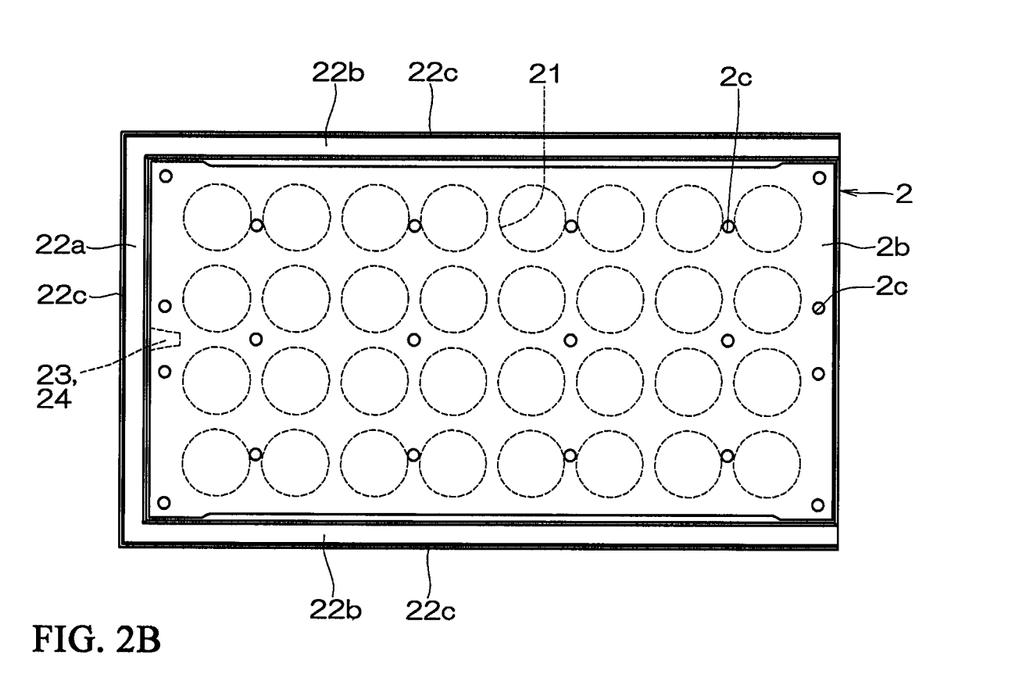
FIG. 2b is a bottom view of the iron plate part of the same electric heating griddle device for baking spherical foods.

Further, on the lower surface 2b of the iron plate part 2, as shown in FIGS. 2a-2b, the screw holes 2c for screwing the bolts A are formed at the positions corresponding to the insertion holes 32b, 33d for the bolts A of the electric heating part 3.

Figure 1B:
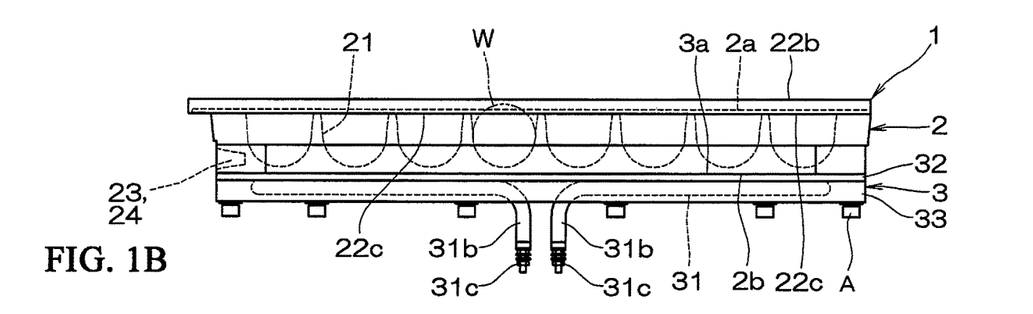
FIG. 1b is a front view of the electric heating griddle device for baking spherical foods shown as an embodiment of the present invention.
Figure 1C:
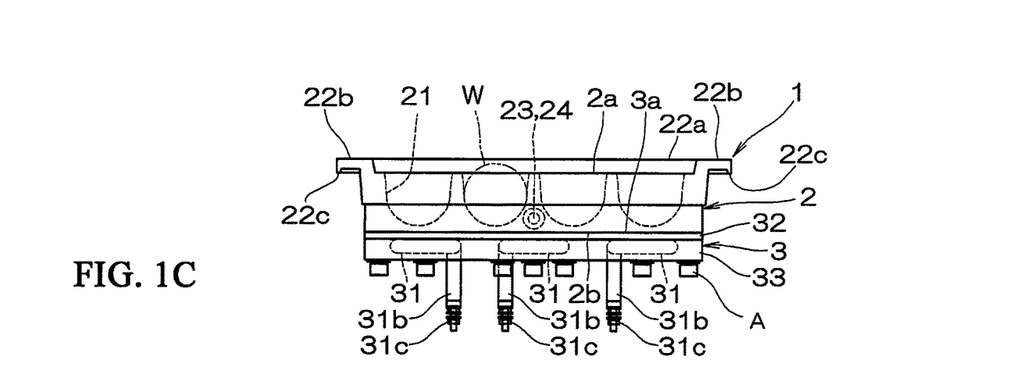
FIG. 1c is a right side view of the electric heating griddle device for baking spherical foods shown as an embodiment of the present invention.

The iron plate part 2 and the electric heating part 3 composed in this way, as shown in FIGS. 1a-1c, are configured to be coupled by the bolts A with the interposition of the heat conductive grease between the lower surface 2b of the iron plate part 2 and the heat transfer surface 3a of the electric heating part 3.

Also, the iron plate part 2, as shown in FIGS. 1*a*-3*g*, includes the end strip-shape frame part 22*a* which extends in a strip shape along an edge of an end of a longitudinal direction of the upper surface 2*a* and which is formed at one step higher from the upper surface 2*a*, and the side strip-shape frame part 22*b*, 22*b* which extends in a strip shape along a side edge of a width direction of the upper surface 2*a* and which is formed at one step higher from the upper surface 2*a*.

Figure 3A:
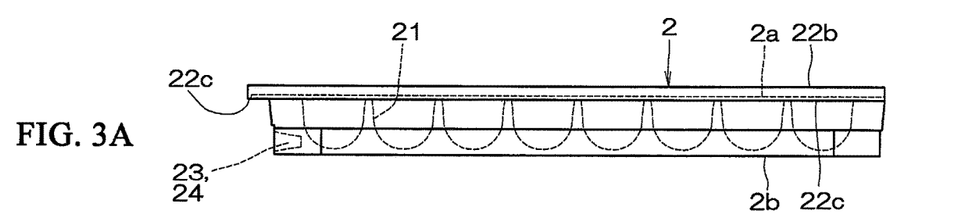
FIG. 3a is a front view of the iron plate part of the same electric heating griddle device for baking spherical foods.
Figure 3B:
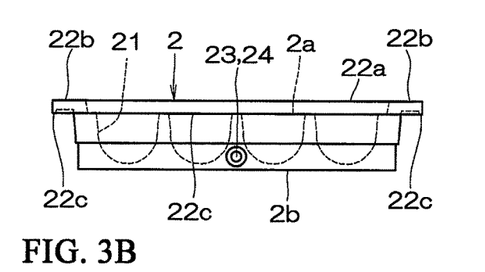
FIG. 3b is a left side view of the iron plate part of the same electric heating griddle device for baking spherical foods.
Figure 3C:
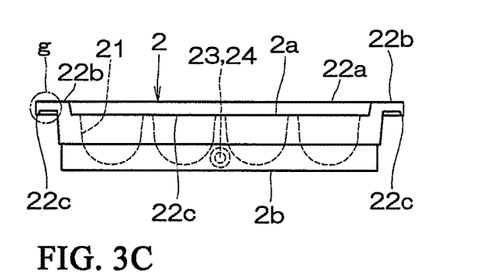
FIG. 3c is a right side view of the iron plate part of the same electric heating griddle device for baking spherical foods.
Figure 3D:
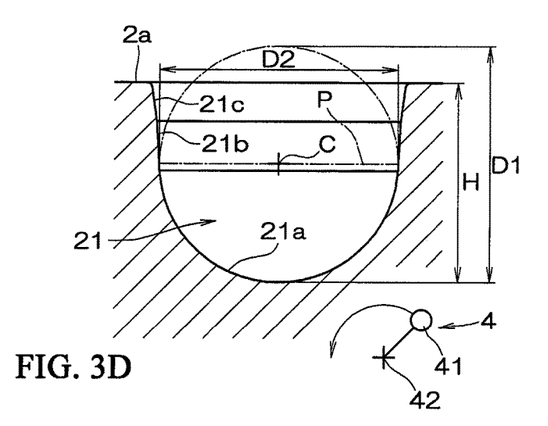
FIG. 3d is an enlarged sectional view of the recess parts of the iron plate part of the same electric heating griddle device for baking spherical foods.
Figure 3E:
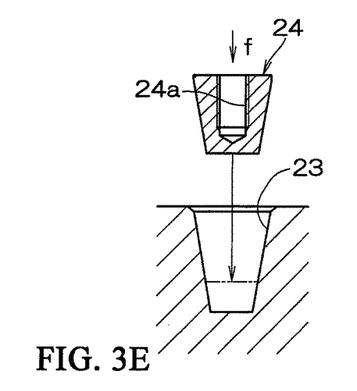
FIG. 3e is an enlarged sectional view of the attaching part of the temperature sensor of the iron plate part of the same electric heating griddle device for baking spherical foods.
Figure 3F:
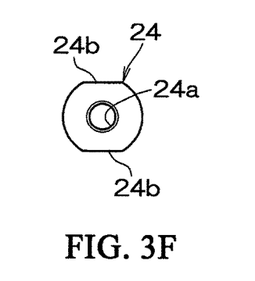
FIG. 3f is a view from the arrow f of the iron plate part of the same electric heating griddle device for baking spherical foods.
Figure 3G:
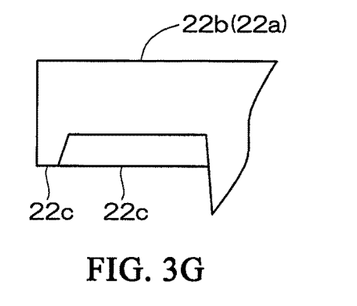
FIG. 3g is an enlarged view of the part g of FIG. 3c.

Each of the end strip-shape frame part 22*a* and the side strip-shape frame part 22*b*, as shown in FIG. 3*g*, respectively has the ridge part 22*c* which protrudes downward along each of outermost edges. Each of the ridge parts 22*c* is formed gradually thinner in a downward direction. The end strip-shape frame part 22*a*, the side strip-shape frame part 22*b* and the ridge parts 22*c* of these are integrally formed of cast iron as the iron plate part 2 and formed by casting surfaces whose surface roughness thereof is around Ra10.

Further, the iron plate part 2 and the electric heating part 3, which are in the state of being integrally connected by the bolts A, are configured to be vibrated by the rotational vibration relating to a predetermined axis. That is, the iron plate part 2 and the electric heating part 3, as shown in FIG. 3*d* for example, receive the rotational vibration around the predetermined axis 42 by the vibrator 4 which generates the rotational vibration by the eccentric load 41 driven rotationally around the axis 42 by an electric motor (not shown).

Further, each of the recess parts 21, as also shown in FIG. 3*d*, has the bottom part 21*a* formed by a curve of a spherical crown less than a hemisphere, the first inner peripheral part 21*b* formed in tapered surface so as to expand gradually in diameter at a predetermined angle toward the upper surface 2*a* of the iron plate part 2 from the upper edge of the bottom part 21*a*, and the second inner peripheral part 21*c* formed in tapered surface so as to expand gradually in diameter at an angle more than the predetermined angle toward the upper surface 2*a* of the iron plate part 2 from the upper edge of this first inner peripheral part 21*b*.

Furthermore, each of the recess parts 21 has the depth H from the upper surface 2*a* of the iron plate part 2 to lowermost part of the bottom part 21*a* to be formed from $6/10$ to $9/10$ of the curvature diameter D1 of the bottom part 21*a*, the diameter D2 in the plane P parallel to the upper surface 2*a* of the iron plate part 2 and which is through the curvature center C of the bottom part 21*a* is formed to be larger than the curvature diameter D1 of the bottom part 21*a*.

Further, in the iron plate part 2, as shown in FIGS. 1*a* to 3*g*, the temperature measurement hole 23 is formed. The temperature measurement hole 23 is configured to be disposed at the central part between the bottom parts 21*a* of the two of the recess parts 21 near the center in the central part in the width direction of the iron plate part 2 in the outer peripheral surface of the one end of the longitudinal direction of the iron plate part 2. This temperature measurement hole 23, as shown in FIGS. 3*e* and 3*f*, is formed to have the tapered inner peripheral surface which is gradually reduced in diameter inwardly.

The temperature measurement hole 23 is configured to be fitted by the temperature measurement piece 24 having the outer peripheral surface tapered corresponding to the tapered inner peripheral surface. The temperature measurement piece 24 is composed of copper as the metal having a good thermal conductivity, the screw hole 24*a* is formed at its axial center part for screwing and fixing the temperature measuring part of the temperature sensor (e.g. thermocouple or thermistor). Meanwhile, a pair of chamfered parts 24*b* parallel to the outer peripheral surface is formed in the temperature measurement piece 24.

According to the electric heating griddle device for baking spherical foods 1 as composed above, since the iron plate part 2 which is formed to be a predetermined thickness between the upper surface 2*a* and the lower surface 2*b* is comprised, and the plurality of recess parts to be concave from the upper surface 2*a* of the iron plate part 2 to bake Takoyaki W are formed, the cast iron is densely filled around each of the recess parts 21. Therefore, the weight around the recess parts 21 is increased, and the heat capacity around the recess parts 21 becomes large. Meanwhile, the heat capacity can be represented by specific heat×weight, and it corresponds to the amount of heat to raise 1° C. of the temperature. Therefore, the part around the recess parts 21 increases the heat capacity and its temperature becomes hard to be raised, otherwise the temperature hardly drops down once the temperature is raised.

Therefore, at the initial phase of baking Takoyaki W, it is possible to suppress the fall of the temperature of the iron plate part 2 around the recess parts 21, then it is possible to shorten the baking time of Takoyaki W. Even when the dough of Takoyaki W which contains much water and is required to be maintained at low temperature is input in the recess parts 21, it is possible to suppress the fall of the temperature around the recess parts 21 and it is possible to shorten the baking time of the Takoyaki W.

Moreover, since the electric heating part 3 is connected to the lower surface 2*b* of the iron plate part 2 so as to be in close contact with the heat transfer surface 3*a*, the heat generated at the electric heating part 3 is directly transferred to the recess parts 21 by using the heat conduction of the cast iron, and the decreased temperature of the recess part can be raised in a short time to the original temperature, it is possible to shorten the baking time of Takoyaki W from this aspect.

Then, since it is possible to shorten the baking time, it is possible to suppress the growth of gluten during the process of baking, Takoyaki W having excellent crispness of the outer peripheral can be obtained.

Further, the iron plate part 2 is made of cast iron, and its surface is welded surface, though, since the lower surface 2*b* is formed planar by machining, the contact area (the heat transfer area) between the lower surface 2*b* thereof and the heat transfer surface 3*a* can be increased. That is, since it is possible to increase the amount of heat transferred from the electric heating part 3 to the iron plate part 2, it is possible to heat the periphery of the recess parts 21 efficiently. Therefore, the decreased temperature around the recess parts 21 at the initial phase can be raised in a short time, then it is possible to shorten the baking time of Takoyaki W from this aspect.

Further, since the plurality of the recess parts 21 are disposed at predetermined intervals in a longitudinal direction of the iron plate part 2, and at predetermined intervals in a width direction of the iron plate part 2, and the electric heating part 3 has the electric heater 31 including the heat generating part 31*a* extending in the longitudinal direction of the iron plate part 2 and being arranged in a plurality of raw in the width direction of the iron plate part 2, the parts corresponding to the recess parts 21 of the iron plate part 2 can be more uniformly and efficiently heated. Therefore, it is possible to shorten the baking time of Takoyaki W, and it is possible to prevent from varying the quality of Takoyaki W to be baked in the recess parts 21.

Furthermore, since the heat generating part 31*a* is fitted into the grooves 331 formed at the mating surface 33*a* of the lower plate part 33 of the upper plate part 32 and the lower plate part 33 having a larger thermal conductivity compared with the cast iron, almost all of the heat generated by the heat generating part 31a is reliably transferred to the upper plate part 32 and the lower plate part 33 and the heat is transferred directly to the iron plate part 2 by the heat conduction. Therefore, since the heat generated by the electric heater 31 can be efficiently used, it is possible to heat the periphery of the recess parts 21 in a short time.

Further, by dividing the upper plate part 32 and the lower plate part 33 which are in the mutual stacked state, the electric heater 31 fitted in the groove 331 is easily confirmed visually and can be replaced by detaching and attaching the electric heater 31 against the groove 331. Therefore, it is possible to improve the maintainability.

Further, since at least the heat conductive grease is filled into the gap between the groove 331 and the heat generating part 31a, the heat of the electric heater 31 can efficiently be transferred to the upper plate part 32 and the lower plate part 33. Therefore, it is possible to heat the periphery of the recess parts 21 in a short time more efficiently.

Further, since a heat conductive grease is interposed between the lower surface 2b of the iron plate part 2 and the heat transfer surface 3a of the electric heating part 3, the heat conductivity from the electric heating part 3 to the iron plate part 2 can be increased. That is, it is possible to heat the periphery of the recess parts 21 of the iron plate part 2 more efficiently in a short time.

Moreover, since the end strip-shape frame part 22a which extends in a strip shape along an edge of an end of the longitudinal direction of the upper surface 2a of the iron plate part 2 and which is formed at one step higher from the upper surface 2a is provided, and the side strip-shape frame part 22b which extends in a strip shape along a side edge of the width direction of the upper surface 2a and which is formed at one step higher from the upper surface 2a of the iron plate part 2 is provided, even when the dough of Takoyaki W becomes the state being spilled from each of the recess parts 21 to the upper surface 2a, it is possible to prevent the dough of Takoyaki W from falling off at the end of a longitudinal direction or each side edge of a width direction from the upper surface 2a of the iron plate part 2.

Moreover, the scraps produced during baking Takoyaki W can be removed smoothly along the upper surface 2a from the other end opposite to the end of the longitudinal direction of the upper surface 2a of the iron plate part 2. In this case, since each of the side strip-shape frame part 22b stands from the upper surface 2a of the iron plate part 2, the scraps of Takoyaki W can be removed cleanly outward from the upper surface 2a by moving the spatula along the standing part as a guide.

Further, as it sometimes happens that the oil drawn to the recess parts 21 and the upper surface 2a during baking Takoyaki W gradually moves beyond the end strip-shape frame part 22a and the side strip-shape frame part 22b and oozes outward of them, each of the end strip-shape frame part 22a and the side strip-shape frame part 22b respectively have ridge parts 22c which protrude downward along each of outermost edges, which prevents the oil from moving around the outer peripheral surface of the side of the iron plate part 2 or the electric heating part 3. Therefore, it is possible that the outer peripheral surface of the iron plate part 2 and the electric heating part 3 are prevented from greasing.

Moreover, since each of the ridge parts 22c is formed gradually thinner in a downward direction, the oil moved around the lower edge of each of the ridge parts 22c can be relatively easily separated from the edges and can be dropped just below each of the ridge parts 22c. Therefore, since, for example, an oil receiver is provided just below each of the ridge parts 22c, the dropped oil can be collected, which prevents from greasing the environment.

Further, since the iron plate part 2 and the electric heating part 3 are configured to be vibrated by the rotational vibration relating to a predetermined axis 42 in a state in which the electric heating part 3 is attached to the iron plate part 2, each of the recess parts 21 has the bottom part 21a formed by a curve of a spherical crown less than a hemisphere and the first inner peripheral part 21b and the inner peripheral part 21b above thereof formed so as to expand in diameter toward the upper surface 2a of the iron plate part 2 from the upper edge of the bottom part 21a, the depth H from the upper surface 2a of the iron plate part 2 to lowermost part of the bottom part 21a is formed to be from $6/10$ to $9/10$ of the curvature diameter D1 of the bottom part 21a, the diameter D2 in a plane P parallel to the upper surface 2a of the iron plate part 2 and which is through the curvature center C of the bottom part 21a is formed to be larger than the curvature diameter D1 of the bottom part 21a, the dough of Takoyaki W inserted into the recess parts 21 starts to rotate around the curvature center C of the bottom part 21a in response to baking and hardening the outer peripheral portion thereof gradually.

That is, since the iron plate part 2 receives the rotational vibration around the predetermined axis and then each of the recess parts 21 receives the vibration displacement around the curvature center C of the bottom part 21a, the dough of Takoyaki W inserted into the recess parts 21 is provided by the driving force to rotate around the curvature center C of the bottom part 21a. Therefore, as the dough of Takoyaki W is baked and the outer peripheral thereof is baked and hardened gradually, it rotates around the curvature center C of the bottom part 21a to be baked in the spherical shape having the diameter corresponding to the curvature diameter D1 of the bottom part 21a.

In this case, since the depth H from the upper surface 2a of the iron plate part 2 to lowermost part of the bottom part 21a is formed to be from $6/10$ to $9/10$ of the curvature diameter D1 of the bottom part 21a, about $1/10$-$4/10$ part of diameter of the baked Takoyaki W protrudes from the upper surface 2a of the iron plate part 2. Therefore, Takoyaki W after baking can be easily taken out from the recess parts 21 by such as piercing the protruded portion with a skewer.

Moreover, since the diameter D2 in the plane P parallel to the upper surface 2a of the iron plate part 2 and which is through the curvature center C of the bottom part 21a is formed to be larger than the curvature diameter D1 of the bottom part 21a, and the first and second inner peripheral parts 21b, 21c, which is upper side of the bottom part 21a, are formed so as to expand in diameter toward the upper surface 2a of the iron plate part 2 from the upper edge of the bottom part 21a, Takoyaki W can be easily taken out from the recess parts 21.

Figure 6A:
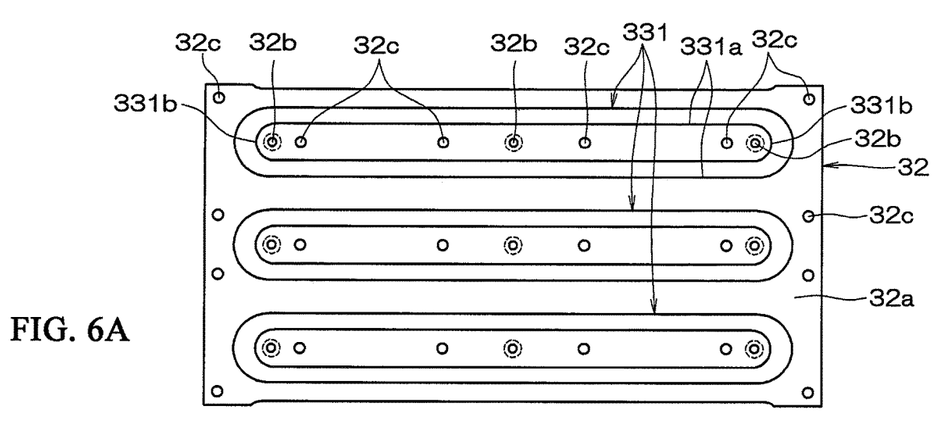
FIG. 6a is a bottom view of the upper plate part in another embodiment of the electric heating part of the same electric heating griddle device for baking spherical foods.
Figure 6B:
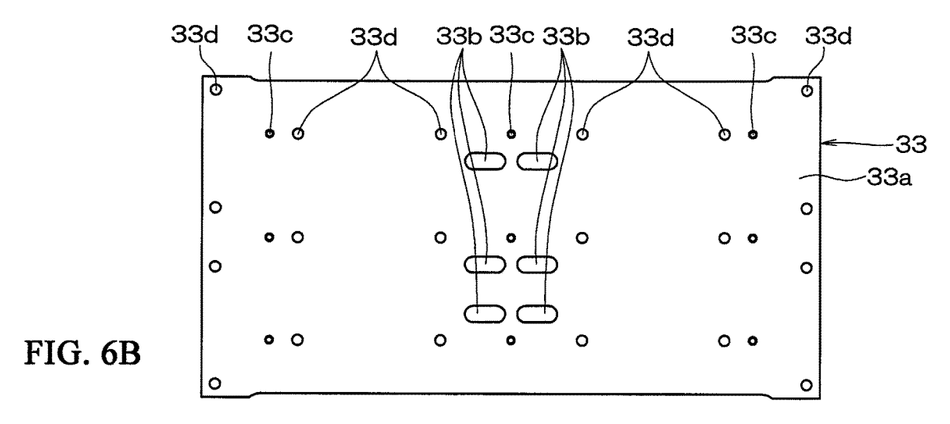
FIG. 6b is a plan view of the lower plate part in another embodiment of the electric heating part of the same electric heating griddle device for baking spherical foods.
Figure 6C:
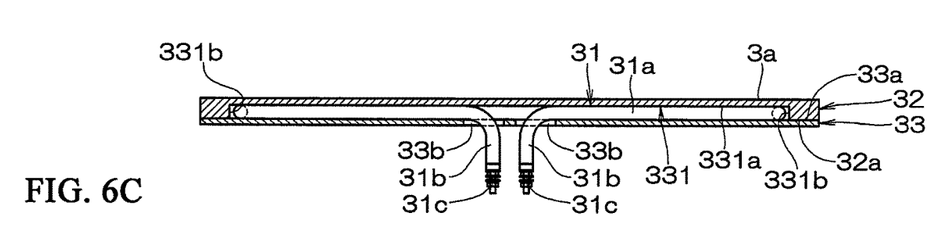
FIG. 6c is a sectional view showing the state that the sheathed heater is embedded to the groove of the upper plate part and the lower plate part is attached under the upper plate part in another embodiment of the electric heating part of the same electric heating griddle device for baking spherical foods.

In the above embodiment, an example that the grooves 331 are formed in the mating surface 33a of the lower plate part 33 is described, though, as shown in FIGS. 6a-6c, the grooves 331 may be configured to be formed in the mating surface 32a of the upper plate part 32. Even in this case, as shown in FIGS. 6b and 6c, the through-holes 33b are provided in the lower plate part 33. Further, the thicker plate, which has a thickness that the grooves 331 can be formed to, needs to be used for the upper plate part 32, the thinner plate can be used for the lower plate part 33 because the grooves 331 does not need to be formed.

Also, the grooves 331 can configure to be provided at both of the mating surfaces 32a, 32b of the upper plate part 32 and the lower plate part 33. However, the through-holes 33b are provided in the lower plate part 33.

Further, the lower surface of the lower plate part 33, shown in the above embodiment or FIGS. 6a, 6c configured to be covered with the heat insulating plate. In this case, since it is possible to prevent the heat from dissipating by the radiation or the like from the lower surface of the lower plate part 33, the iron plate part 2 can be heated more efficiently.

Next, an outline of a main body of spherical foods baking machine that operates the electrical heating griddle device for baking spherical foods according to an embodiment of the present invention will be described with reference to FIGS. 1 and 7 to 10.

Figure 9:
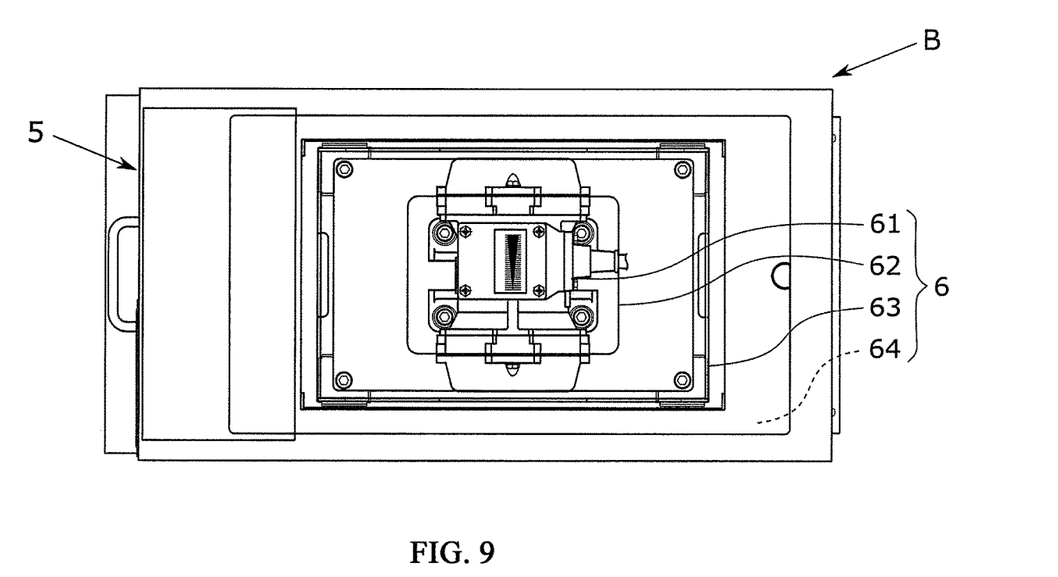
FIG. 9 is a plan view of the main body and the inside conceptually shown in FIG. 7.
Figure 10:
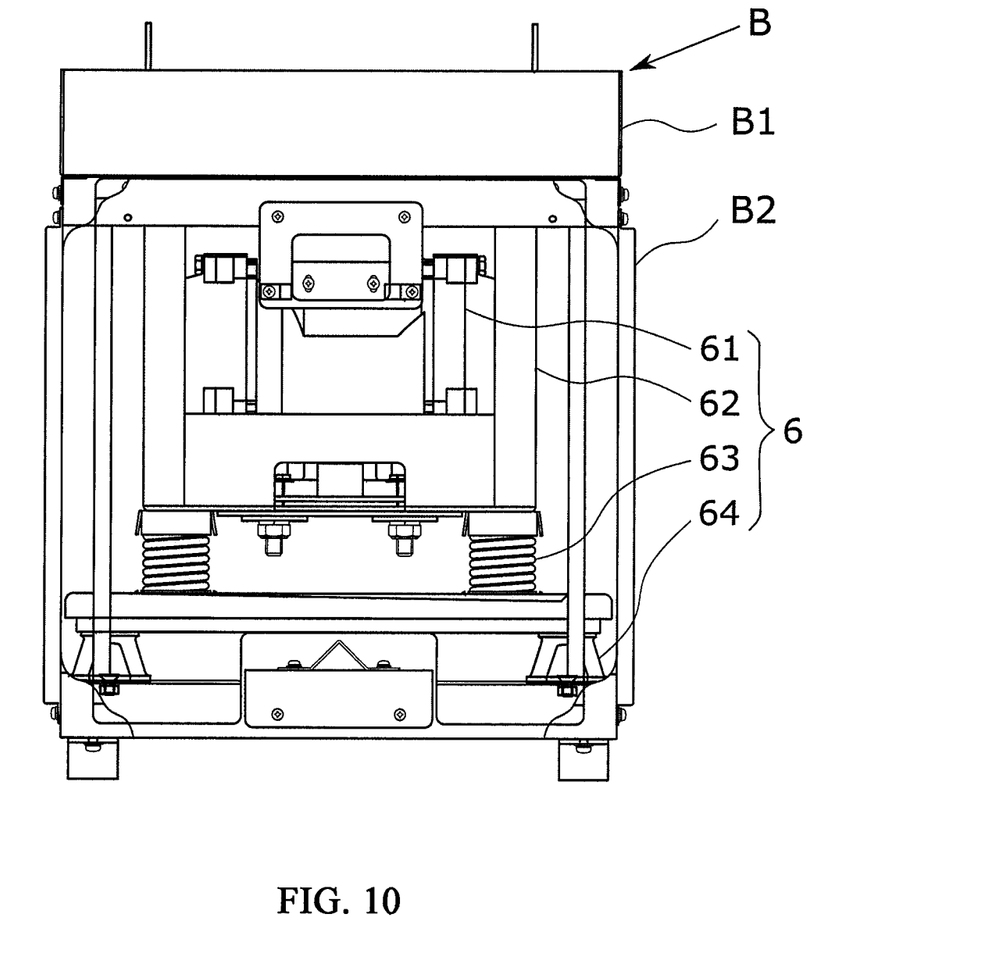
FIG. 10 is a right side view of the main body and the inside conceptually shown in FIG. 7.

In FIG. 9 and FIG. 10, it has drawn so that an internal structure can be seen except a part of outer frame which forms a main body of spherical foods baking machine.

In these figures, there are some cases where a plurality of identical portions are numbered only in one portion. For convenience of explanation, there are places where a predetermined portion and this lead line are indicated by a broken line or an imaginary line (two-dot chain line).

Figure 7:
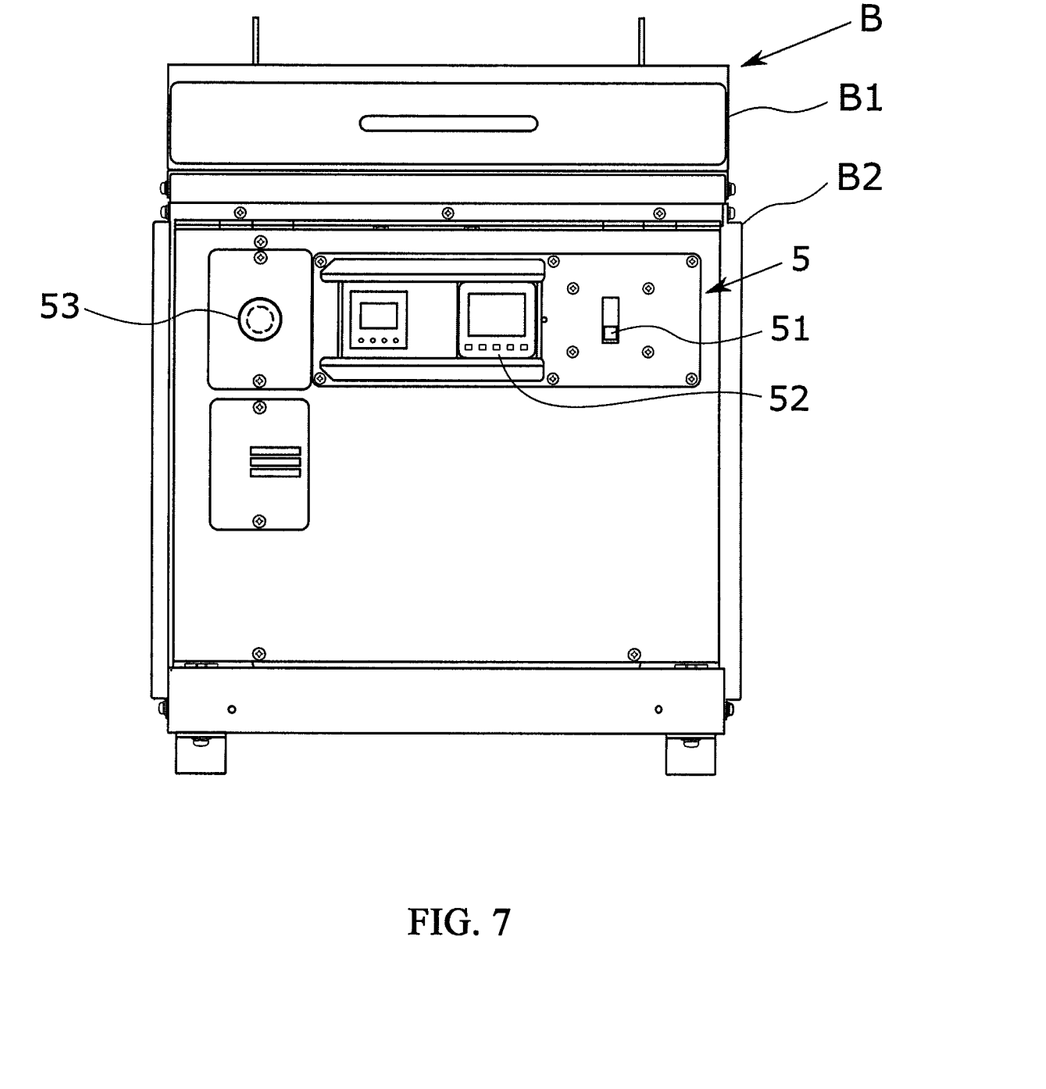
FIG. 7 is a left side view of the main body of spherical foods baking machine according to an embodiment of the present invention operating the electric heating griddle device for baking spherical foods conceptually.

As shown in FIG. 7, the main body of spherical foods baking machine B is a box-shaped device on which equipment for baking foods is mounted using the electrical heating griddle device for baking spherical foods 1 shown in FIG. 1.

This device includes a main body upper part B1 provided for mounting the electrical heating griddle device for baking spherical foods 1, and a main body lower part B2 provided integrally below the upper part of the main body B1 for operating the electrical heating griddle device for baking spherical foods.

Figure 8:
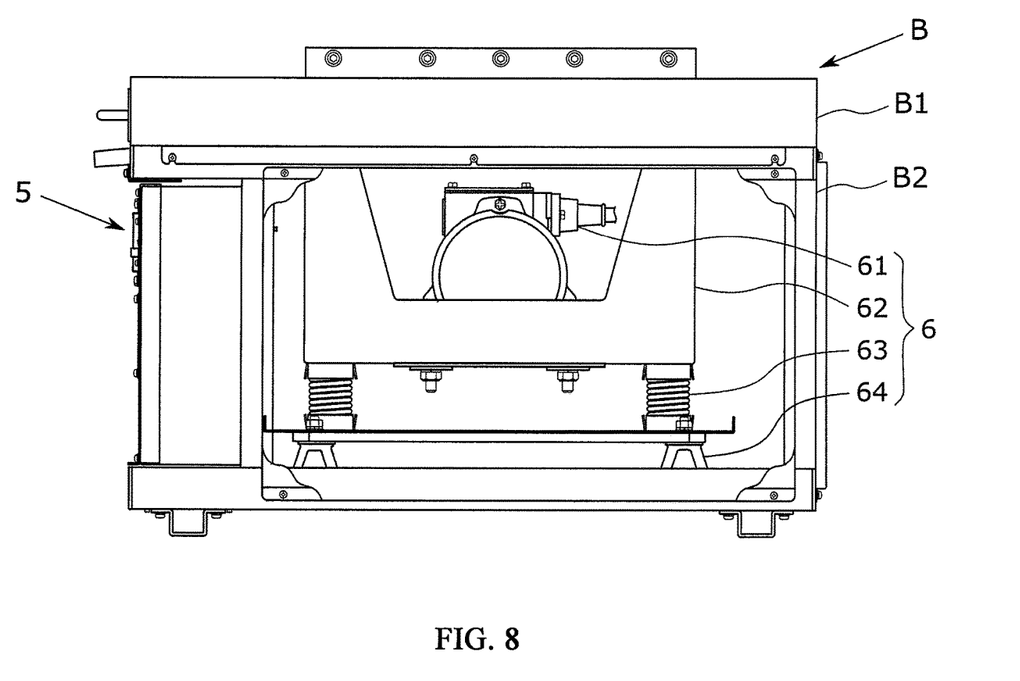
FIG. 8 is a front view of the main body and the inside conceptually shown in FIG. 7.

As shown in FIG. 7 and FIG. 8, in the lower part B2 of the main body, an electric component 5 for controlling the heating and vibration of the electrical heating griddle device for baking spherical foods as shown in FIG. 1 and a vibration component 6 vibrating the iron plate 2 in the electrical heating griddle device for baking spherical foods.

The electrical component 5 and the vibration component 6 are respectively installed in areas separated in the main body lower part B2.

As shown in FIG. 7, the electrical component 5 includes a power switch 51 that operates the main body B, a temperature controller 52 that sets the temperature of the iron plate section 2 shown in FIG. 1, and a vibration switch 53 that operates the vibration component 6.

The temperature adjuster 52 sends electricity to the electric heater 31 provided in the iron plate part 2 and maintains a set temperature.

The temperature controller 52 controls the temperature of the electric heater 31 based on the temperature of the iron plate part 2 measured by a temperature sensor (not shown) connected to a predetermined portion of the iron plate part 2.

The vibration switch 53 controls the vibration frequency and vibration time of the vibration component 6 and the timing at which the vibration unit 6 is vibrated with a sequencer (not shown).

In addition, there is no limitation in the installation position and detailed specification of the power switch 51, the temperature controller 52, and the vibration switch 53.

As shown in FIGS. 8 to 10, the vibration component 6 includes a vibration device 61 (equivalent to the above-described vibration device 4) that vibrates the iron plate portion 2 shown in FIG. 1, a vibration device outer frame 62 provided for mounting the vibration device 61 on the lower part B2 of the main body, a vibration auxiliary unit 63 provided on the back surface of the vibration device outer frame 62, and a vibration prevention unit 64 provided via a predetermined plate material laid under the vibration assisting part 63.

The vibration device 61 corresponds to, for example, a vibration motor, and controls the start/end of vibration, vibration frequency, the vibration time, and the timing of vibration from the vibration switch 53.

The vibration device outer frame 62 is formed in a box shape so as to surround the vibration device 61 from the outside with a plate material.

The upper end of the vibration device outer frame 62 protrudes from the main body upper part B1 in order to connect to the electrical heating griddle device for baking spherical foods 1 shown in FIG. 1.

The back surface of the vibration device outer frame 62 is planar.

The vibration preventing unit 64 reduces the vibration transmission efficiency so that the vibration of the vibration assisting unit 63 accompanying the vibration of the vibration device outer frame 62 is not transmitted to the main body lower part B2 having the electric component 5.

For example, it corresponds to a spring, rubber, or damper, and is provided at each of the four corners between a predetermined plate material laid under the vibration assisting portion 63 and the bottom surface of the main body lower portion B2.

As a method of using the main body B, for example, it is used as follows.

First, the electrical heating griddle device for baking spherical foods 1 shown in FIG. 1 is installed in the main body upper part B1, and the iron plate part and the vibration component 6 are made controllable by the electrical component 5.

Next, the temperature controller 52 and the vibration component 6 are brought into an operable state by the power switch 51 of the electrical component 5, and the iron plate unit 2 is adjusted to a temperature necessary for baking the foods by the temperature controller 52.

Thereafter, food ingredients and the like are poured into the iron plate portion and baked for a predetermined time.

And when the part which contact the iron plate part 2 of the foods is baked, the vibration frequency and vibration time of the vibration apparatus 61 are set with the vibration switch 53 of the electrical component part 5.

When the iron plate portion 2 is vibrated via the vibration device outer frame 62, the foods rotates while vibrating in the iron plate portion 2 and is baked to a desired state after the set vibration time of the vibration device 61 has elapsed.

Due to the configuration of the main body of spherical foods baking machine B and the method of using the main body of spherical foods baking machine B, the heat and vibration of the iron plate portion 2 shown in FIG. 1 are evenly transmitted to the entire food so that the baking time of the foods is shortened.

DESCRIPTION OF SYMBOLS

1 the electric heating griddle device for baking spherical foods
2 the iron plate part
2a the upper surface
2b the lower surface
3 the electric heating part
3a the heat transfer surface 21 the recess part
21a the bottom part
21b the first inner peripheral part (the inner peripheral part)
21c the second inner peripheral part (the inner peripheral part)
22a the end strip-shape frame part
22b the side strip-shape frame part
22c the ridge part
31 the electric heater
31a the heat generating part
32 the upper plate part
32a, 33a the mating surfaces
33 the lower plate part
42 the predetermined axis
331 the grooves
C the curvature center of the bottom part
D1 the curvature diameter of the bottom part
D2 the diameter in a plane parallel to the upper surface
H the depth
P the plane parallel to the upper surface
W the spherical foods (Takoyaki)
B the main body of spherical foods baking machine
5 the electrical component
6 the vibration component

The invention claimed is:

1. An electric heating griddle device for baking spherical foods comprising:
   an iron plate part made of cast iron, which has an upper surface and a lower surface that are planar, and which is formed to be a predetermined thickness between the upper surface and the lower surface, the iron plate part including an end strip-shape frame part which extends in a strip shape along an edge of an end of a longitudinal direction of the upper surface and which is formed at one step higher from the upper surface; and a side strip-shape frame part which extends in a strip shape along an side edge of a width direction of the upper surface and which is formed at one step higher from the upper surface, wherein each of the end strip-shape frame part and the side strip-shape frame part respectively has a ridge part which protrudes downward along each of outermost edges, the ridge part being formed gradually thinner in a downward direction; and
   an electric heating part connected to the iron plate part so as to contact a heat transfer surface with the lower surface of the iron plate part;
   wherein the iron plate part has a plurality of recess parts which are formed to be concave from the upper surface to bake the spherical foods; and
   wherein the electric heating part is formed so as that the heat transfer surface is broad to substantially conform to the lower surface of the iron plate part.

2. The electric heating griddle device for baking spherical foods according to claim 1, wherein the iron plate part is formed so as that the lower surface becomes planar by machining.

3. The electric heating griddle device for baking spherical foods according to claim 1, wherein the upper surface of the iron plate part is formed in a rectangular shape in a plan view;
   wherein the plurality of the recess parts are disposed at predetermined intervals in a longitudinal direction of the upper surface, and at predetermined intervals in a width direction of the upper surface; and
   wherein the electric heating part, in a connecting state with the iron plate part, has an electric heater including a heat generating part extending in the longitudinal direction of the iron plate part and being arranged in a plurality of raw in the width direction of the iron plate part.

4. The electric heating griddle device for baking spherical foods according to claim 1, wherein the electric heating part has an upper plate part and a lower plate part which are made of material having a larger thermal conductivity compared with the cast iron, and which form a mutual stacked state, and has an electric heater;
   wherein the upper plate part comprises the heat transfer surface in a top surface of the upper plate part; and
   wherein the electric heater is configured as that the heat generating part is fitted into grooves formed at least one of mating surfaces of the upper plate part and the lower plate part.

5. The electric heating griddle device for baking spherical foods according to claim 1, wherein a heat conductive grease is interposed between the lower surface of the iron plate part and the heat transfer surface of the electric heating part.

6. The electric heating griddle device for baking spherical foods according to claim 1;
   wherein the iron plate part and the electric heating part are configured to be vibrated by a rotational vibration relating to a predetermined axis in a state in which the electric heating part is attached to the iron plate part; and
   wherein each of the recess parts has a bottom part formed by a curve of a spherical crown less than a hemisphere and an inner peripheral part formed so as to expand in diameter toward the upper surface of the iron plate part from an upper edge of the bottom part, a depth from the upper surface of the iron plate part to lowermost part of the bottom part is formed to be from $6/10$ to $9/10$ of a curvature diameter of the bottom part, a diameter in a plane parallel to the upper surface of the iron plate part and which is through a curvature center of the bottom part is formed to be larger than the curvature diameter of the bottom part.

* * * * *